(12) United States Patent
Song et al.

(10) Patent No.: US 9,277,475 B2
(45) Date of Patent: *Mar. 1, 2016

(54) MOBILITY PARAMETER ADJUSTMENT AND MOBILITY STATE ESTIMATION IN HETEROGENEOUS NETWORKS

(71) Applicant: BlackBerry Limited, Waterloo (CA)

(72) Inventors: Yi Song, Plano, TX (US); Chandra Sekhar Bontu, Nepean (CA); Zhijun Cai, Ashburn, VA (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/251,401

(22) Filed: Apr. 11, 2014

(65) Prior Publication Data

US 2014/0220979 A1    Aug. 7, 2014

Related U.S. Application Data

(63) Continuation of application No. 13/422,161, filed on Mar. 16, 2012, now Pat. No. 8,744,449.

(51) Int. Cl.
| | |
|---|---|
| *H04W 36/00* | (2009.01) |
| *H04W 36/32* | (2009.01) |
| *H04W 36/08* | (2009.01) |
| *H04W 84/04* | (2009.01) |

(52) U.S. Cl.
CPC .......... *H04W 36/32* (2013.01); *H04W 36/0083* (2013.01); *H04W 36/08* (2013.01); *H04W 84/045* (2013.01); *H04W 84/047* (2013.01)

(58) Field of Classification Search
CPC . H04W 36/0083; H04W 36/08; H04W 36/32; H04W 84/045; H04W 84/047; H04W 24/02; H04W 28/08; H04W 36/0016; H04W 72/04; H04W 76/028; Y02B 60/50

USPC .......................................................... 455/436
See application file for complete search history.

(56) References Cited

U.S. PATENT DOCUMENTS

| | | |
|---|---|---|
| 8,305,997 B2 | 11/2012 | Virkki et al. |
| 2005/0037798 A1 | 2/2005 | Yamashita et al. |

(Continued)

FOREIGN PATENT DOCUMENTS

| | | |
|---|---|---|
| EP | 1806941 | 2/2010 |
| WO | 2011/042414 | 4/2011 |
| WO | 2011/123006 | 10/2011 |

OTHER PUBLICATIONS

Pantech; "Consideration on Counting Only Macro Cell Changes," 3GPP TSG-RAN WG2 Meeting #76, R2-116041, Nov. 14-18, 2011, San Francisco, U.S., 5 pages.

(Continued)

*Primary Examiner* — Timothy Pham
(74) *Attorney, Agent, or Firm* — Fish & Richardson P.C.

(57) ABSTRACT

Systems and methods for mobility parameter adjustment and mobility state estimation in heterogeneous networks are provided. The mobility parameters may be adjusted based on the cell change types associated with the mobility procedure. The mobility procedure may be a cell handover procedure or a cell reselection procedure. The cell change type may be dependent on the transmission power level of the UE's serving cell and neighboring cells. In some implementations, the UE may provide a speed information to the serving cell such that the serving eNB may prioritize or optimize the mobility procedure for the UE. The UE may also estimate its mobility state by counting the number of cell changes within certain period of time and applying scaling factors to the number of cell changes based on the associated cell change types.

31 Claims, 6 Drawing Sheets

(56) References Cited

U.S. PATENT DOCUMENTS

| | | | |
|---|---|---|---|
| 2007/0253385 | A1 | 11/2007 | Li et al. |
| 2009/0059871 | A1 | 3/2009 | Nader et al. |
| 2009/0143093 | A1* | 6/2009 | Somasundaram .... H04W 36/32 455/525 |
| 2009/0181661 | A1 | 7/2009 | Kitazoe et al. |
| 2010/0124918 | A1 | 5/2010 | Agashe et al. |
| 2010/0240368 | A1 | 9/2010 | Fox et al. |
| 2010/0309782 | A1 | 12/2010 | Lee et al. |
| 2011/0194530 | A1 | 8/2011 | Tinnakornsrisuphap et al. |
| 2011/0263262 | A1 | 10/2011 | Min et al. |
| 2011/0275394 | A1 | 11/2011 | Song et al. |
| 2012/0026972 | A1 | 2/2012 | Miao et al. |
| 2013/0005344 | A1* | 1/2013 | Dimou .............. H04W 36/0083 455/441 |
| 2013/0040692 | A1* | 2/2013 | Chen .................... H04W 36/04 455/525 |
| 2013/0084849 | A1 | 4/2013 | Koskinene et al. |
| 2013/0210434 | A1* | 8/2013 | Dimou et al. ................. 455/436 |
| 2013/0229939 | A1* | 9/2013 | Teyeb et al. .................... 370/252 |
| 2014/0187243 | A1* | 7/2014 | Rune et al. .................... 455/436 |
| 2015/0215830 | A1* | 7/2015 | Dalsgaard ......... H04W 36/0094 455/444 |

OTHER PUBLICATIONS

Research in Motion UK Limited; "Pico Cell Discovery in a Heterogeneous Network," 3GPP TSG-RAN WG2 Meeting #76; R2-115967, Nov. 14-18, 2011, San Francisco, U.S., 3 pages.

Samsung; "Issues Related to UE Mobility State Estimation in HetNet," 3GPP TSG-RAN2 #76 Meeting; R2-116273, Nov. 14-18, 2011, San Francisco, U.S., 3 pages.

ZTE; "Discussion on Enhancement of Small Cell Discovery," 3GPP TSG-RAN WG2 Meeting #76, R2-115769, Nov. 14-18, 2011, San Francisco, U.S., 3 pages.

ZTE; "Discussion on Enhancement of Mobility State Estimation," 3GPP TSG-RAN WG2 Meeting #76, R2-115770, Nov. 14-18, 2011, San Francisco, U.S., 5 pages.

ZTE; "Discussion on the Mobility Performance Enhancement for Co-Channel HetNet Deployment," 3GPP TSG-RAN WG2 Meeting #75bis, R2-114950, Oct. 10-14, 2011, Zhuhai, China, 7 pages.

Office Action issued in U.S. Appl. No. 13/422,161 on Mar. 26, 2013; 12 pages.

Office Action issued in U.S. Appl. No. 13/422,161 on Oct. 10, 2013; 14 pages.

Notice of Allowance issued in U.S. Appl. No. 13/422,161 on Jan. 23, 2014; 14 pages.

International Search Report and Written Opinion of the International Searching Authority issued in International Application No. PCT/US2013/030157 on May 17, 2013; 15 pages.

3GPF TSG-RAN2 Meeting #77, R2-120822, "TTT Configuration for HetNet Mobility," Dresden, Germany, Feb. 6-10, 2012, 4 pages.

3GPP TSG-RAN WG2 Meeting #75, R2-113794, "Discussion on the Mobility Performance Enhancement for Co-Channel HetNet Deployment," Athens, Greece, Aug. 22-26, 2011, 7 pages.

Extended European Search Report issued in European Application No. 13761786.6 on Nov. 24, 2015.

* cited by examiner

FIG. 9

MOBILITY PARAMETER ADJUSTMENT AND MOBILITY STATE ESTIMATION IN HETEROGENEOUS NETWORKS

CROSS-REFERENCE TO RELATED APPLICATIONS

This application is a continuation of U.S. Application No. 13/422,161 filed on Mar. 16, 2012, the entire contents of which are hereby incorporated by reference.

FIELD

This disclosure relates to mobility procedures in heterogeneous networks, and more particularly, to mobility parameter adjustment and mobility state estimation in heterogeneous networks.

BACKGROUND

In an Evolved Universal Terrestrial Radio Access Network (E-UTRAN), cells of different coverage sizes may be deployed to improve cell coverage or to offload traffic. In an E-UTRAN network, small cells (e.g., pico cells, relay cells, or femto cells) may be deployed with overlaid macro cells. A network including large cells (e.g., macro cells) as well as small cells (e.g., pico cells, relay cells, femto cells) may be referred to as a heterogeneous network. User equipment (UE) in the heterogeneous network may move in a large geographical area which may result in changing of the UE's serving cell and the cell type (e.g., macro cell, pico cell, relay cell, femto cell) of the UE's serving cell.

BRIEF DESCRIPTION OF DRAWINGS

For a more complete understanding of this disclosure, reference is now made to the following brief description of the drawings, taken in connection with the accompanying drawings and detailed description, wherein like reference numerals represent like parts.

DETAILED DESCRIPTION

The present disclosure is directed to systems, methods, and apparatuses for mobility parameter adjustment and UE mobility state estimation in heterogeneous wireless communication networks. Heterogeneous networks may include cells of various coverage sizes resulting at least in part from different transmission power levels of base stations, e.g., macro cell, femto cell, pico cell, relay cell, etc. As the UE moves across cell boundaries, a mobility procedure such as cell handover or cell reselection may be performed to ensure that the UE is connected or camped on a serving cell with good coverage for the UE. Since the heterogeneous network may contain various types of cells, various cell change types may be associated with the UE. For example, the UE may move from a macro cell to a pico cell, and then the associated cell change type may be a macro-to-pico cell change. The UE may also move from a pico cell to a macro cell, or from a pico cell to a pico cell, or from a macro cell to a macro cell, as well as others, and the associated cell change type may be a pico-to-macro cell change, or pico-to-pico cell change, or macro-to-macro cell change, and other cell changes. Depending on the cell change types, the optimal value of mobility parameters for the UE may be chosen differently. The mobility parameters may be adjusted based on the specific cell change type in order to optimize, maximize or otherwise improve the performance of the mobility procedures. In addition, the UE may estimate a current mobility state based on the cell change types.

To improve the performance of the UE mobility procedure, the UE can, in some implementations, execute one or more of the following methods: (1) scale the mobility parameters based on the cell change type; (2) additional scaling of the mobility parameters for UEs in cell range expansion; (3) provide additional information such as speed information to the network to avoid handover failure; or (4) scale the number of cell changes based on cell change types in order to estimate the UE's mobility state more accurately. In regards to scaling the mobility parameters, the UE may detect the types of cells for the serving cell and neighboring cells according to their transmission power levels. The UE may also detect the types of cells for the serving cell and neighboring cells by receiving an explicit message from the base stations identifying the cell types.

In the first implementation, the UE may scale down some mobility parameters (e.g., time-to-trigger, measurement report event trigger threshold, cell reselection timer, cell reselection threshold) when the cell change type involves a small size cell such as a pico cell, relay cell, femto cell, or others. In doing so, the UE may be able to start the mobility procedure at an earlier time and thereby reduce the chance of the UE losing connection with a serving cell. In the second implementation, the UE may apply additional scaling to some mobility parameters when cell range expansion is enabled. For example, if a neighboring cell is range-expansion-enabled, the handover region size is usually large (e.g., the UE may initiate a handover procedure to a neighboring pico cell for traffic offloading as the UE moves into the cell edge area of the neighboring pico cell) due to the early triggering of a measurement report event, which in turn allows a large time-to-trigger value compared to the situation when there is no range expansion. Similarly, the measurement report event trigger threshold may be increased for a large handover region when range expansion is enabled. In the third implementation, the UE may have the capability to estimate its speed using a global positioning system (GPS) or Doppler spread estimation, or other techniques, and may report this information to the base station. The base station may optimize the UE mobility procedure to avoid a handover failure based on the UE speed information. For example, the base station may send the handover command to the UE at an early time prior to receiving the handover request acknowledgement from the target cell for a high-speed UE or in general, the HO related backhaul messages with the potential target cells for a high speed UE can be prioritized compared to a slow moving UE. In the fourth implementation, the UE may estimate its mobility state by counting the number of cell changes during a certain period of time. The number of cell changes may be weighed differently based on the types of cell changes such that the counted number of cell changes reflects the UE speed more accurately. For example, one macro to macro cell change may count as one cell change, while one macro to pico cell change may count as a 0.4 cell change, and one pico to pico cell change may count as a 0.2 cell change. By weighting the number of cell changes differently base on the types of cell changes, a more accurate estimation of UE mobility state may be achieved.

Figure 1:
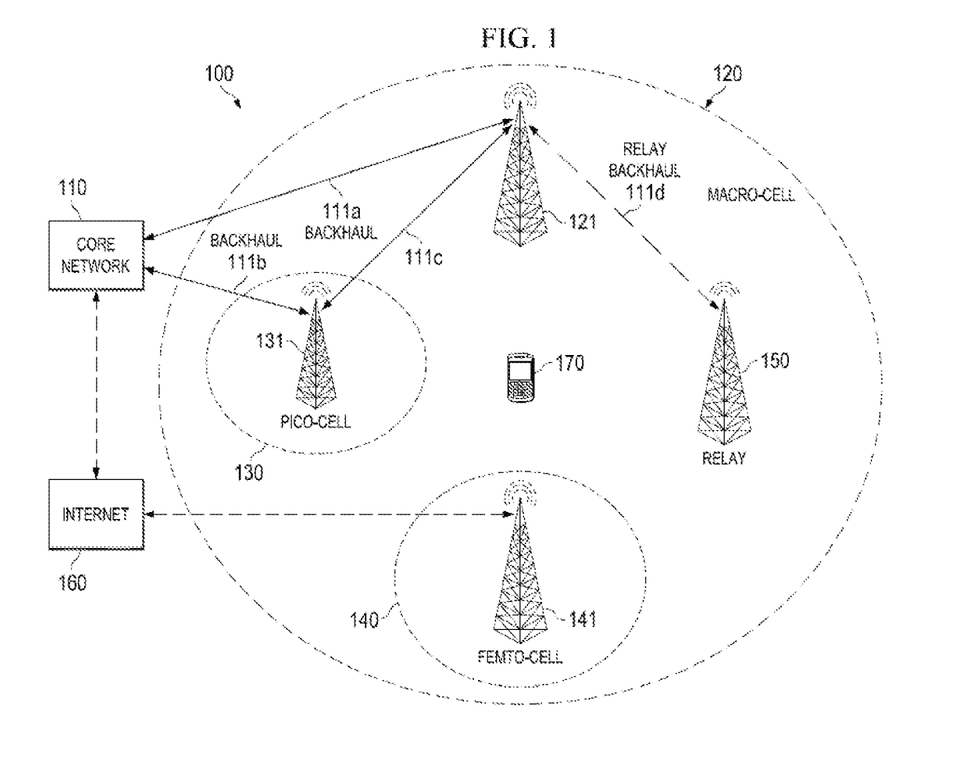
FIG. 1 is a schematic representation of an example heterogeneous wireless communication network.

FIG. 1 is schematic representation of an example heterogeneous wireless communication network 100. The term "heterogeneous wireless communication network" or "heterogeneous network" may also be referred to as a "Hetnet." The illustrated heterogeneous network 100 includes a core network 110 and a macro cell or overlay cell 120. The term "cell" or "wireless cell" generally refers to an area of coverage of wireless transmission by a network or network component, such as an access node. The core network 110 can be connected to the Internet 160. In the illustrated implementation, the macro cell 120 can include at least one base station. The term "base station" can be interchangeably used with a network node, an access node, or a network component. Two or more base stations may operate on the same radio frequency or on different radio frequencies.

The base station can be an overlay access node 121 connected to the core network 110 via a backhaul link 111a, including optical fiber or cable. The term "overlay access node" generally refers to a network element or component that at least partly serves to form a wireless cell. In one implementation in which the network 100 is an LTE network, the overlay access node 121 can be a Universal Terrestrial Radio Access Network (UTRAN) node B or "eNB" which is part of an evolved Universal Terrestrial Radio Access Network (E-UTRAN). An eNB that forms an overlay access node of a macro cell can be generally referred to as a "macro eNB." The term "eNB" may be interchangeably used with an "evolved node B." The eNBs may cooperate to conduct a mobility procedure for User Equipment (UE) in the network 100. To conduct the mobility procedure, the eNBs may exchange information such as transmission power levels via the backhaul link 111a or 111b or 111c or 111d. The eNBs may also configure mobility parameters (e.g., time-to-trigger, measurement report event trigger, cell reselection threshold, cell reselection timer) for the UE. These mobility parameters may be different depending on the cell change types in the mobility procedure. The eNBs may also optimize, maximize, or otherwise improve the mobility procedure for the UE. For example, the eNB may send a handover command earlier to the UE when the eNBs determine that the UE is in a high mobility state. When the eNB processes the handover related messages from/to the backhaul links, the eNB could also give a high priority to the messages associated with a UE with high mobility state.

The network 100 can also include one or more underlay cells, for example, a pico cell 130 and a femto cell 140. The underlay cells can have a coverage at least partially overlapping with the coverage of the macro cell 120. While the term "underlay cell" is described herein in the context of the long term evolution (LTE) standard, other wireless standards can also have components similar to underlay cells. The implementations described herein can be adapted for such standards without departing from the scope of this disclosure. Although FIG. 1 illustrates only one pico cell and only one femto cell, the network 100 can include more or less cells. The underlay cells 130, 140 have a smaller coverage than the overlay cell 120. For example, in a suburban environment, the overlay cell 120 may have a coverage radius of 0.5 kilometer, while the underlay cells 130, 140 may have a coverage radius of 0.2 kilometer. Access nodes 131, 141 forming the underlay cells 130, 140 can use a lower transmission power than that of the overlay access node 121. The underlay cells 130, 140 may further include a range expansion area used for increasing the coverage area for the cells having a smaller coverage.

The pico cell 130 can include a pico eNB 131 connected to the core network 110 via a backhaul link 111b and to the macro eNB 121 via a backhaul link 111c. The backhaul links 111b and 111c may include cable, fiber, wireless links, or others. In some implementations, the pico eNB 131 can have a transmission power that is, for example, about 30 dBm, which is about 13 dB lower than that of the macro eNB 121.

The femto cell 140 can include a femto eNB 141 connected to the core network 110 via the Internet 160 via a wired or wireless connection. The femto cell 140 is a subscription based cell and can be referred to as a closed subscription group (CSG) cell. The term "closed subscription group (CSG)" can be interchangeably used with closed subscriber group. The term "femto eNB" can also be referred to as a "home eNB (HeNB)." In such instances, the macro eNB 121 can be referred to as a source eNB. In some implementations, the femto eNB 141 can have a transmission power that is, for example, about 20 dBm, which is about 23 dB lower than that of the macro eNB 121.

The network 100 can also include a relay node 150 which serves to wirelessly relay data and/or control information between the macro eNB 121 and user equipment 170. The macro eNB 121 and the relay node 150 can be connected to each other via a wireless backhaul link 111d. In such an instance, the macro eNB 121 can be referred to as a donor eNB. In some implementations, the relay node 150 can have a transmission power that is, for example, about 30 or 37 dBm, which is about 13 dB or 6 dB lower than that of the macro eNB 121. The term "underlay access node" generally refers to pico eNBs, femto eNBs, or relay nodes.

The user equipment 170 can communicate wirelessly with any one of the overlay access node 121 or the underlay access nodes 131, 141, 150, depending on the location or the existence of subscription in the case of the femto cell 140. The term "user equipment" (alternatively "UE") can refer to various devices with telecommunications capabilities, such as mobile devices and network appliances. The UE may be referred to as a connected mode UE when the UE is actively connected with an eNB for communication. The UE may be referred to as an idle mode UE when the UE is powered on but not actively connected with an eNB for communication. The UE 170 may switch from the coverage of one cell to another cell, for example, from the coverage of the pico cell 130 to the coverage of the macro cell 120, i.e., a pico-to-macro cell change, or from the coverage of a macro cell 120 to the coverage of the pico cell 130, i.e., a macro-to-pico cell change. A mobility procedure (e.g., cell handover, cell reselection) may be conducted to ensure that the UE does not lose connection with the network while switching between cells. Different mobility parameters may be used base on the types of cell changes. For example, a smaller time-to-trigger value and measurement report even trigger value may be used for the macro-to-pico cell change compared to the macro-to-macro cell change. When range expansion for the smaller size cells is enabled, additional adjustment on the mobility parameters may be implemented. The UE 170 may also estimate its mobility state by counting the number of cell changes during a certain period of time. Depending on the cell change times, the number of cell changes may be scaled differently in order to estimate the UE's mobility state more accurately when cells of different coverage sizes are deployed in the network.

Examples of user equipments include, but are not limited to, a mobile phone, a smart phone, a telephone, a television, a remote controller, a set-top box, a computer monitor, a computer (including a tablet computer such as BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, a game device, etc. The UE 170 may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 170 may include the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

Figure 2:
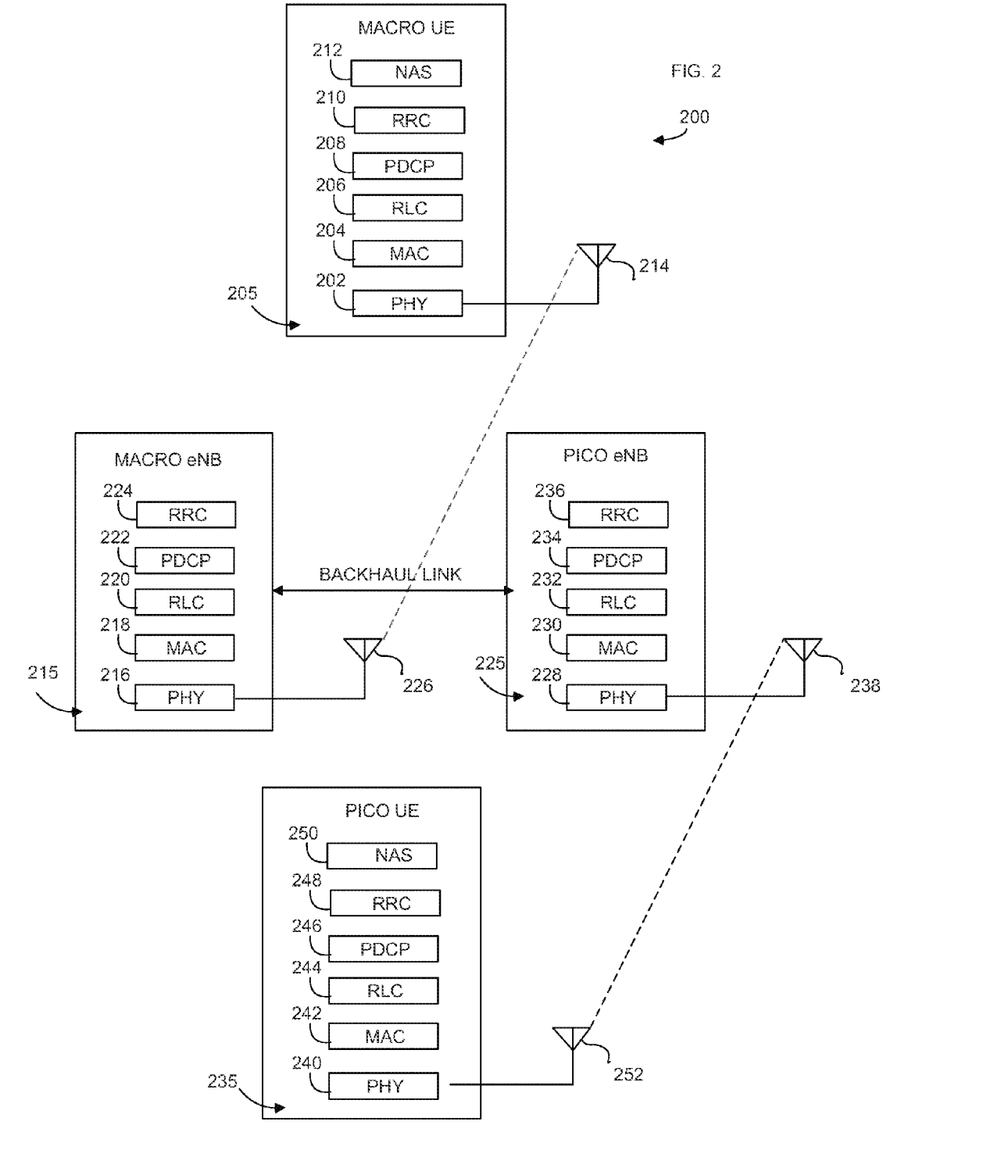
FIG. 2 is a schematic block diagram illustrating various layers of access nodes and user equipments in a wireless communication network.

FIG. 2 is a schematic block diagram 200 illustrating various layers of access nodes and user equipments in a wireless communication network. The illustrated system 200 includes a macro eNB 215, a pico eNB 225, a macro UE 205, and a pico UE 235. Here macro UE 205 and Pico UE 235 are UEs which are either actively communicating or camping on macro eNB 215 and pico eNB 225 respectively. The macro eNB 215 and the pico eNB 225 can be collectively referred to as a "network," "network components," "network elements," "access nodes," or "access devices." FIG. 2 shows only these four devices (alternatively, referred to as "apparatuses" or "entities") for illustrative purposes, and the system 200 can further include one or more of these devices without departing from the scope of this disclosure. The macro eNB 215 can communicate wirelessly with the macro UE 205. The pico eNB 225 can communicate wirelessly with the pico UE 235. The macro eNB 215 can communicate with the pico eNB 225 via a backhaul link, for example, an X2 backhaul link, a wireless connection, or a combination thereof. In some implementations, the macro eNB 215 and pico eNB 225 may exchange their transmission power levels via the backhaul link.

Each of the devices 205, 215, 225 and 235 includes a protocol stack for communications with other devices via wireless or wired connection. The macro eNB 215 can include a physical (PHY) layer 216, a medium access control (MAC) layer 218, a radio link control (RLC) layer 220, a packet data convergence protocol (PDCP) layer 222, and a radio resource control (RRC) layer 224. In the case of user plane communications for data traffic, RRC layer is not involved. The macro eNB 215 can also include one or more transmit and receive antennas 226 coupled to the PHY layer 216. In the illustrated implementation, a "PHY layer" can also be referred to as "layer 1." A MAC layer can also be referred to as "layer 2." The other layers (RLC layer, PDCP layer, RRC layer and above) can be collectively referred to as a "higher layer(s)."

Similarly, the pico eNB 225 includes a PHY layer 228, a MAC layer 230, a RLC layer 232, a PDCP layer 234, and an RRC layer 236. The pico eNB 225 can also include one or more antennas 238 coupled to the PHY layer 228.

The macro UE 205 can include a PHY layer 202, a MAC layer 204, a RLC layer 206, a PDCP layer 208, an RRC layer 210, and a non-access stratum (NAS) layer 212. The macro UE 205 can also include one or more transmit and receive antennas 214 coupled to the PHY layer 202. Similarly, the pico UE 235 can include a PHY layer 240, a MAC layer 242, a RLC layer 244, a PDCP layer 246, an RRC layer 248, and a NAS layer 250. The pico UE 235 can also include one or more transmit and receive antennas 252 coupled to the PHY layer 240.

Communications between the devices, such as between the macro eNB 215 and the macro UE 205, generally occur within the same protocol layer between the two devices. Thus, for example, communications from the RRC layer 224 at the macro eNB 215 travel through the PDCP layer 222, the RLC layer 220, the MAC layer 218, and the PHY layer 216, and are sent over the PHY layer 216 and the antenna 226 to the macro UE 205. When received at the antenna 214 of the macro UE 205, the communications travel through the PHY layer 202, the MAC layer 204, the RLC layer 206, the PDCP layer 208 to the RRC layer 210 of the macro UE 205. Such communications are generally done utilizing a communications sub-system and a processor, as described in more detail below.

In the implementations described in this disclosure, various steps and actions of the macro eNB, macro UE, pico eNB, and pico UE can be performed by one or more of the layers described above in connection with FIG. 2. For example, mobility procedure for the macro UE 205 can be performed by one or more of the layers 202-212 of the macro UE 205. Mobility procedure by the pico UE 235 can be performed by one or more of the layers 240-250 of the pico UE 235. Mobility state estimation may be performed by the PHY layer and MAC layer of the macro UE 205 and pico UE 235. For another example, configuration of UE mobility parameters may be initiated by the RRC layer 224 of the macro eNB 215 and the RRC layer 236 of the pico eNB 225.

Figure 3:
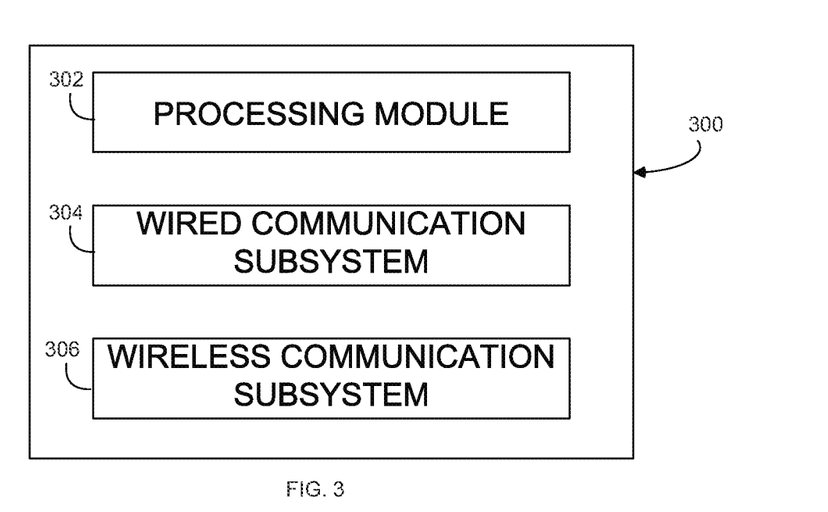
FIG. 3 is a schematic block diagram illustrating an access node device.

FIG. 3 is a schematic block diagram 300 illustrating an access node device. The illustrated device 300 includes a processing module 302, a wired communication subsystem 304, and a wireless communication subsystem 306. The processing module 302 can include one or more processing components (alternatively referred to as "processors" or "central processing units" (CPUs)) capable of executing instructions related to one or more of the processes, steps, or actions described above in connection with one or more of the implementations disclosed herein. The processing module 302 can also include other auxiliary components, such as random access memory (RAM), read only memory (ROM), secondary storage (for example, a hard disk drive or flash memory). The processing module 302 can form at least part of the layers described above in connection with FIG. 2. In particular, the processing module 302 may be configured to determine mobility parameters associated different cell change types. The processing module 302 may also be configured to receive UE speed information and to transmit a handover command at an earlier time for UEs in high mobility state. The processing module 302 can execute certain instructions and commands to provide wireless or wired communication, using the wired communication subsystem 304 or a wireless communication subsystem 306. A skilled artisan will readily appreciate that various other components can also be included in the device 300.

Figure 4:
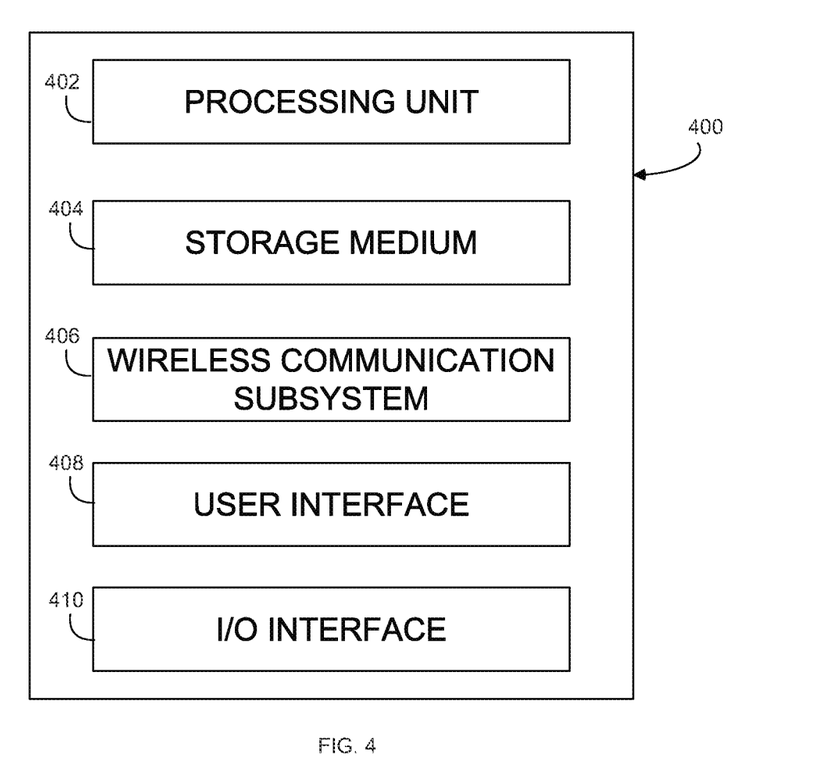
FIG. 4 is a schematic block diagram illustrating user equipment device.

FIG. 4 is a schematic block diagram 400 illustrating user equipment device. The illustrated device 400 includes a processing unit 402, a computer readable storage medium 404 (for example, ROM or flash memory), a wireless communication subsystem 406, a user interface 408, and an I/O interface 410.

Similar to the processing module 302 of FIG. 3, the processing unit 402 can include one or more processing components (alternatively referred to as "processors" or "central processing units" (CPUs)) configured to execute instructions related to one or more of the processes, steps, or actions described above in connection with one or more of the implementations disclosed herein. In particular, the processing module 402 may be configured to determine mobility parameters associated different cell change types and executing a mobility procedure accordingly. The processing module 402 may also be configured to perform a mobility state estimation taking into account of different cell change types. The processing module 402 may further be configured to detect a range expansion associated with an eNB and adjust the mobility procedures according to a UE processing procedure associated with the range expansion. The processing unit 402 can also include other auxiliary components, such as random access memory (RAM) and read only memory (ROM). The computer readable storage medium 404 can store an operating system (OS) of the device 400 and various other computer executable software programs for performing one or more of the processes, steps, or actions described above.

The wireless communication subsystem 406 is configured to provide wireless communication for data and/or control information provided by the processing unit 402. The wireless communication subsystem 406 can include, for example, one or more antennas, a receiver, a transmitter, a local oscillator, a mixer, and a digital signal processing (DSP) unit. In some implementations, the subsystem 406 can support multiple input multiple output (MIMO) transmissions.

The user interface 408 can include, for example, one or more of a screen or touch screen (for example, a liquid crystal display (LCD), a light emitting display (LED), an organic light emitting display (OLED), a microelectromechanical system (MEMS) display), a keyboard or keypad, a trackball, a speaker, and a microphone. The I/O interface 410 can include, for example, a universal serial bus (USB) interface. A skilled artisan will readily appreciate that various other components can also be included in the device 400.

Figure 5:
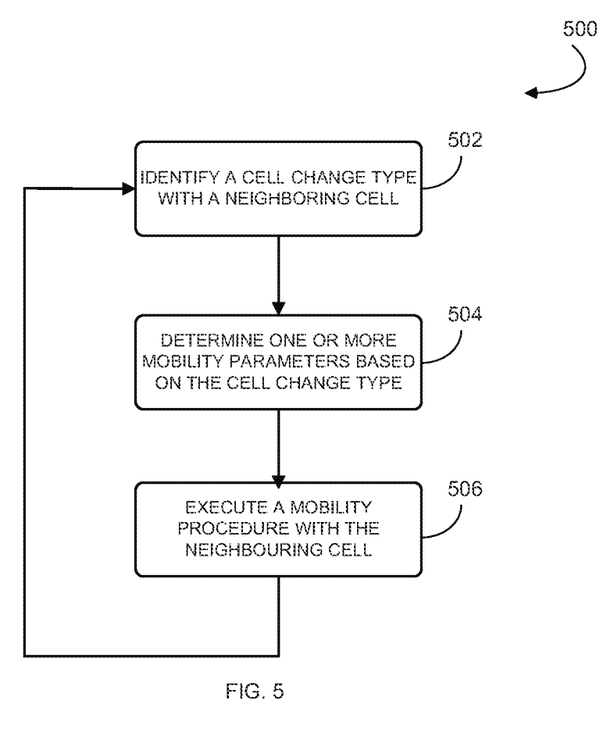
FIG. 5 is a schematic flow diagram illustrating a method for performing a mobility procedure in a heterogeneous network in user equipment device.

FIG. 5 is a schematic flow diagram 500 illustrating a method for performing a mobility procedure in a heterogeneous network in user equipment device. As shown in FIG. 5, the UE first identifies a cell change type with a neighboring cell at step 502. The cell change type may be based in part on a transmission power level of the UE's serving cell and a transmission power level with the neighboring cell. For example, the cell change type may be a macro-to-pico cell change, pico-to-macro cell change, macro-to-macro cell change, pico-to-pico cell change, or others. The cell change type may also depend on the coverage size of the serving cell and the neighboring cell. Usually the coverage size of a pico cell, femto cell, or relay cell is smaller than the coverage size of a macro cell. The cell change type may be a large cell to small cell change when the UE travels from a macro cell to a pico cell, femto cell, or relay cell. The cell change type may be a small to large cell change when the UE travels from a pico cell, femto cell, or relay cell to a macro cell. The cell change type may be a large cell to large cell change when the UE travels from a macro cell to another macro cell or a small cell to small cell change when the UE travels from a pico/femto/relay cell to another pico/femto/relay cell. In order to assist the UE in identifying the cell change type, the eNBs may signal their transmission power levels to the UE via a broadcast message or a radio resource control (RRC) message. In this case, the eNBs may exchange their transmission power levels over the backhaul links. The eNBs may also signal the neighbor cell types (e.g., macro cell, pico cell, femto cell) to the UE via the broadcast message or the RRC message.

After identifying the cell change type with the neighboring cell, the UE may determine one or more mobility parameters based on the cell change type at step 504. The one or more mobility parameters may include one or more of a time-to-trigger parameter, a measurement report event trigger threshold, a cell reselection timer, a cell reselection threshold, cell range expansion timer, or others. The value of the mobility parameters may be different for different cell change types. For example, the time-to-trigger parameter may be set as a smaller value for the macro-to-pico cell change than the macro-to-macro cell change. The value of the mobility parameters associated with different cell change types may be directly signaled by the eNB to the UE. Alternatively or in addition, the eNB may signal a nominal value of the mobility parameter and one or more scaling factors associated with different cell change types. The UE may determine the value of the mobility parameter associated with different cell change types based on the scaling factors. Then the UE may determine the mobility parameter for the neighboring cell based on the associated cell change type and the scaling factor for that cell change type. The mobility parameters associated with different cell change types may also be pre-configured by the eNB or pre-set or defined in the standards.

The UE may then execute a mobility procedure with the neighboring cell at step 506 using the one or more determined mobility parameters determined. The mobility procedure may be a cell handover procedure for a connected mode UE or may be a cell reselection procedure for an idle mode UE. The connected mode UE may use the mobility parameters such as time-to-trigger, measurement report event trigger threshold, or cell range expansion timer to initiate a handover procedure. For example, when the received downlink signal power from the neighboring cell is stronger than the received downlink signal power from the serving cell and the received downlink signal power difference between the neighboring cell and the serving cell is above the measurement report even trigger threshold for a period longer than the time-to-trigger parameter, the UE may send a neighboring cell measurement report to the serving eNB indicating this event. The idle mode UE may use the mobility parameters such as cell reselection timer, cell reselection threshold, or cell range expansion timer to initiate a cell reselection procedure. The cell reselection procedure may result in the UE camping on a different serving cell. Because the mobility parameters used in the mobility procedure is adjusted to suit for different cell change types, the mobility procedure performance may be greatly enhanced in terms of mobility procedure latency and success rate. As the UE travels to other areas, other neighboring cells may be discovered and the UE's serving cell may change. The UE may execute step 502-506 for each newly discovered neighboring cell, and the UE may execute these steps when the UE's serving cell changes.

Figure 6:
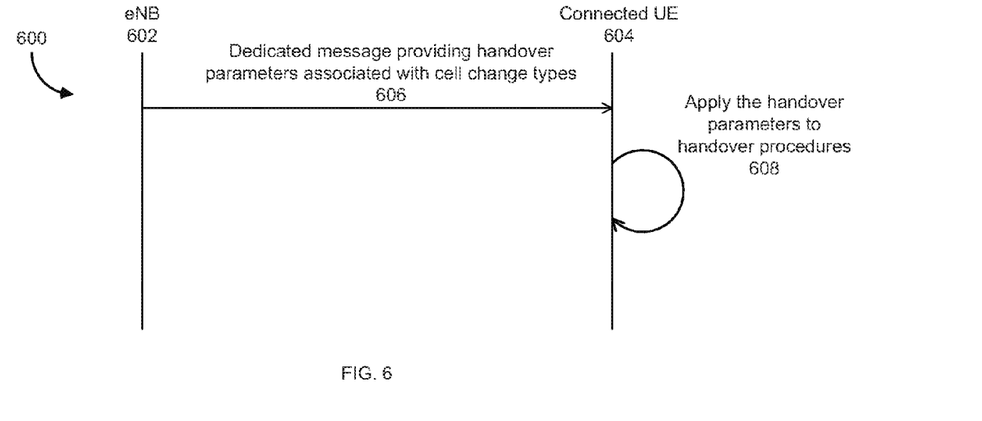
FIG. 6 is a schematic flow diagram illustrating transmission of mobility parameters from an eNB to a connected mode UE.

FIG. 6 is a schematic flow diagram 600 illustrating transmission of mobility parameters from an eNB to a connected mode UE. At various intervals, eNB 602 may transmit a dedicated message 606 providing handover parameters associated with cell change types to the connected mode UE 604. Subsequently, the UE 604 may apply the handover parameters to handover procedures at step 608. The handover parameters in message 606 may include time-to-trigger parameter, measurement report event trigger threshold, cell range expansion timer, or others. The cell change types may depend on the transmission power of the serving eNB and neighboring eNB, or coverage cell size of the serving eNB and neighboring eNB. For example, the cell change types for the connected mode UE 604 may include macro-to-macro handover, macro-to-pico handover, pico-to-macro handover or pico-to-pico handover. The dedicated message 606 may be a RRC message from the eNB to the connected mode UE. As an example, the handover parameter time-to-trigger associated with different cell change types (e.g., timeToTrigger-MacroToPico, timeToTrigger-PicoToMacro, timeToTrigger-PicoToPico) may be signaled to the UE in a ReportConfigEUTRA information element illustrated in Table 1.

TABLE 1

ReportConfigEUTRA information element

```
-- ASN1START
ReportConfigEUTRA ::=         SEQUENCE {
   triggerType                   CHOICE {
      event                         SEQUENCE {
         eventId                       CHOICE {
            eventA1                       SEQUENCE {
               a1-Threshold                  ThresholdEUTRA
            },
            eventA2                       SEQUENCE {
               a2-Threshold                  ThresholdEUTRA
            },
            eventA3                       SEQUENCE {
               a3-Offset                     INTEGER (-30..30),
               reportOnLeave                 BOOLEAN
            },
            eventA4                       SEQUENCE {
               a4-Threshold                  ThresholdEUTRA
            },
            eventA5                       SEQUENCE {
               a5-Threshold1                 ThresholdEUTRA,
               a5-Threshold2                 ThresholdEUTRA
            },
            ...,
            eventA6-r10                   SEQUENCE {
               a6-Offset-r10                 INTEGER (-30..30),
               a6-ReportOnLeave-r10          BOOLEAN
            }
         },
         hysteresis                    Hysteresis,
         timeToTrigger                 TimeToTrigger
         timeToTrigger-MacroToPico     TimeToTrigger   OPTIONAL,   -- Cond ON
         timeToTrigger-PicoToMacro     TimeToTrigger   OPTIONAL,   -- Cond ON
         timeToTrigger-PicoToPico      TimeToTrigger   OPTIONAL,   -- Cond ON
      },
      periodical                    SEQUENCE {
         purpose                       ENUMERATED {
            reportStrongestCells, reportCGI}
      }
   },
   ...
}
...
}
-- ASN1STOP
```

In some implementations, the time-to-trigger parameter for different types of handovers may be signaled to the UE by signaling scaling factors associated with the handover types relative to a nominal time-to-trigger value. For example, the scaling factors may be signaled to the UE in the MeasConfig information element as shown in Table 2. Depending on the cell change types, i.e., handover types in this example, associated with the neighboring cell, the UE may obtain the appropriate time-to-trigger value by multiplying the nominal time-to-trigger by the cell change type dependent scaling factor.

TABLE 2

MeasConfig and CellTypeScaleFactors information elements

```
-- ASN1START
MeasConfig ::=                SEQUENCE {
   -- Measurement objects
   measObjectToRemoveList        MeasObjectToRemoveList      OPTIONAL,   -- Need ON
   measObjectToAddModList        MeasObjectToAddModList      OPTIONAL,   -- Need ON
   -- Reporting configurations
   reportConfigToRemoveList      ReportConfigToRemoveList    OPTIONAL,   -- Need ON
   reportConfigToAddModList      ReportConfigToAddModList    OPTIONAL,   -- Need ON
   -- Measurement identities
   measIdToRemoveList            MeasIdToRemoveList          OPTIONAL,   -- Need ON
   measIdToAddModList            MeasIdToAddModList          OPTIONAL,   -- Need ON
   -- Other parameters
   quantityConfig                QuantityConfig              OPTIONAL,   -- Need
```

TABLE 2-continued

MeasConfig and CellTypeScaleFactors information elements

```
ON
  measGapConfig               MeasGapConfig              OPTIONAL,  -- Need
ON
  s-Measure                   RSRP-Range                 OPTIONAL,  -- Need
ON
  preRegistrationInfoHRPD     PreRegistrationInfoHRPD    OPTIONAL,  -- Need
OP
  speedStatePars    CHOICE {
    release                       NULL,
    setup                         SEQUENCE {
      mobilityStateParameters       MobilityStateParameters,
      timeToTrigger-SF              SpeedStateScaleFactors
      timeToTrigger-CellType-SF     CellTypeScaleFactors   OPTIONAL,  -- Cond
ON
    }
  }                                                       OPTIONAL,  -- Need
ON
  ...
}
MeasIdToRemoveList ::=         SEQUENCE (SIZE (1..maxMeasId)) OF MeasId
MeasObjectToRemoveList ::=     SEQUENCE (SIZE (1..maxObjectId)) OF MeasObjectId
ReportConfigToRemoveList ::=   SEQUENCE (SIZE (1..maxReportConfigId)) OF ReportConfigId
-- ASN1STOP
                        CellTypeScaleFactors information element
-- ASN1START
CellTypeScaleFactors ::=   SEQUENCE {
  ServingMacroNeighbourPico     ENUMERATED {oDot25, oDot5, oDot75, lDot0},
  ServingPicoNeighbourMacro     ENUMERATED {oDot25, oDot5, oDot75, lDot0},
  ServingPicoNeighbourPico      ENUMERATED {oDot25, oDot5, oDot75, lDot0},
}
-- ASN1STOP
```

In some implementations, the eNB may signal a cell range expansion scaling factor to the UE. For handovers which involve a cell range expansion enabled cell, the UEs may scale the time-to-trigger parameter according to the cell range expansion scaling factor. For example, the cell range expansion scaling factors may be signaled to the UE in the MeasConfig information element as shown in Table 3. For the UE to determine whether the cell is range expansion enabled or not, the cell range expansion information may be included in the small cell list which is a list including the information of the neighboring small cells. One additional bit may be added for each small cell to indicate whether the cell is range expansion enabled or not. Alternatively or in addition, a range expansion bias value may be included for each small cell. The bias value may be grouped into multiple categories for signaling purpose. The small cell list can be signaled to the UE via either a broadcast message or a RRC message. The information of the neighboring small cells could also be included in the measSubframePatternConfigNeigh-r10 field of MeasObjectEUTRA information element.

TABLE 3

MeasConfig and CellRangeExpansionScaleFactors information elements

```
-- ASN1START
MeasConfig ::=                  SEQUENCE {
  -- Measurement objects
  measObjectToRemoveList          MeasObjectToRemoveList     OPTIONAL,  -- Need
ON
  measObjectToAddModList          MeasObjectToAddModList     OPTIONAL,  -- Need
ON
  -- Reporting configurations
  reportConfigToRemoveList        ReportConfigToRemoveList   OPTIONAL,  -- Need
ON
  reportConfigToAddModList        ReportConfigToAddModList   OPTIONAL,  -- Need
ON
  -- Measurement identities
  measIdToRemoveList              MeasIdToRemoveList         OPTIONAL,  -- Need
ON
  measIdToAddModList              MeasIdToAddModList         OPTIONAL,  -- Need
ON
  -- Other parameters
  quantityConfig                  QuantityConfig             OPTIONAL,  -- Need
ON
  measGapConfig                   MeasGapConfig              OPTIONAL,  -- Need
ON
  s-Measure                       RSRP-Range                 OPTIONAL,  -- Need
ON
  preRegistrationInfoHRPD         PreRegistrationInfoHRPD    OPTIONAL,  -- Need
OP
  speedStatePars    CHOICE {
```

TABLE 3-continued

MeasConfig and CellRangeExpansionScaleFactors information elements

```
        release                    NULL,
        setup                      SEQUENCE {
            mobilityStateParameters    MobilityStateParameters,
            timeToTrigger-SF           SpeedStateScaleFactors
            timeToTrigger-CellRE-SF    CellRangeExpansionScaleFactors   OPTIONAL, -- Cond
ON
        }
    }                                                                  OPTIONAL,  -- Need
ON
    ...
}
...
-- ASN1STOP
                    CellRangeExpansionScaleFactors information element
-- ASN1START
CellRangeExpansionScaleFactors ::=  SEQUENCE {
    ServingCellRangeExpansion       ENUMERATED {oDot25, oDot5, oDot75, lDot0},
    NeighbourCellRangeExpansion     ENUMERATED {four, two, fourOverThree, one},
}
-- ASN1STOP
```

In addition to the time-to-trigger parameter, the measurement report event trigger threshold may also be adjusted based on different cell change types and UE speed. The measurement report event trigger threshold may also be referred to as an A3 offset in an EUTRA network. For example, the scaling factors for A3 offset may be signaled in a ReportConfigEUTRA information element as shown in Table 4. For medium and high mobility state, the A3 offset may be added by a negative number for earlier triggering of the measurement report.

TABLE 4

ReportConfigEUTRA information element

```
-- ASN1START
ReportConfigEUTRA ::=       SEQUENCE {
    triggerType                 CHOICE {
        event                       SEQUENCE {
            eventId                     CHOICE {
                eventA1                     SEQUENCE {
                    a1-Threshold                ThresholdEUTRA
                },
                eventA2                     SEQUENCE {
                    a2-Threshold                ThresholdEUTRA
                },
                eventA3                     SEQUENCE {
                    a3-Offset                   INTEGER (-30..30),
                    reportOnLeave               BOOLEAN
                },
                eventA4                     SEQUENCE {
                    a4-Threshold                ThresholdEUTRA
                },
                eventA5                     SEQUENCE {
                    a5-Threshold1               ThresholdEUTRA,
                    a5-Threshold2               ThresholdEUTRA
                },
                ...,
                eventA6-r10                 SEQUENCE {
                    a6-Offset-r10               INTEGER (-30..30),
                    a6-ReportOnLeave-r10        BOOLEAN
                }
            },
            hysteresis              Hysteresis,
            hysteresisSF            SEQUENCE {
                sf-Medium               ENUMERATED {dB-6, dB-4, dB-2, dB0},
                sf-High                 ENUMERATED {dB-6, dB-4, dB-2, dB0}
            }
            timeToTrigger           TimeToTrigger
        },
```

TABLE 4-continued

| ReportConfigEUTRA information element | |
|---|---|
| periodical | SEQUENCE { |
|   purpose |   ENUMERATED { |
| |     reportStrongestCells, reportCGI} |
|   } | |
| }, | |
| ... | |
| } | |
| ... | |
| } | |
| -- ASN1STOP | |

Figure 7:
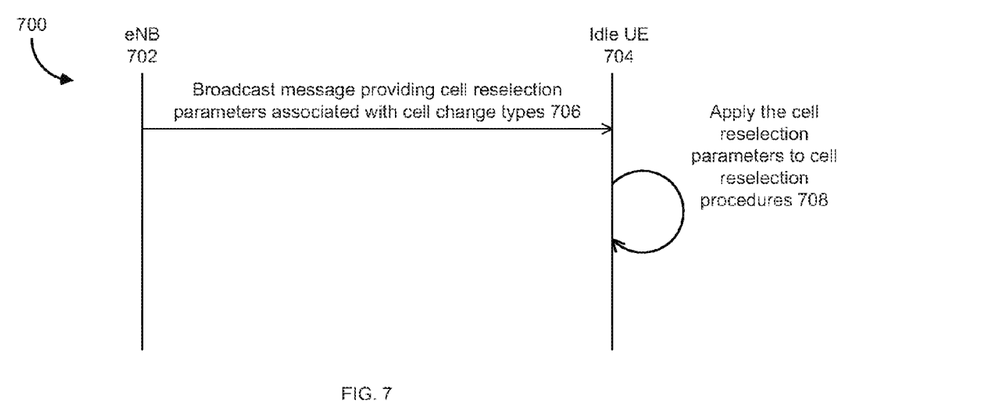
FIG. 7 is a schematic flow diagram illustrating transmission of mobility parameters from an eNB to an idle mode UE.

FIG. 7 is a schematic flow diagram 700 illustrating transmission of mobility parameters from an eNB to an idle mode UE. As shown in FIG. 7, eNB 702 may transmit a broadcast message 706 providing handover parameters associated with cell change types to the idle mode UE 704. Subsequently, the UE 704 may apply the cell reselection parameters to cell reselection procedures at step 708. The cell reselection parameters in message 706 may include a cell reselection timer, a cell reselection threshold, a cell range expansion timer, or others. The broadcast message 706 may be a system information block (SIB) message broadcasted by the eNB. As an example, the scaling factors for cell reselection parameters associated with different cell change types, e.g., Qhyst (cell reselection threshold) and Treselection (cell reselection timer), may be signaled to the UE in a SystemInformationBlockType3 information element illustrated in Table 5.

TABLE 5

| SystemInformationBlockType3 information element | | | |
|---|---|---|---|
| -- ASN1START | | | |
| SystemInformationBlockType3 ::= | SEQUENCE { | | |
|   cellReselectionInfoCommon | SEQUENCE { | | |
|     q-Hyst | ENUMERATED { | | |
| |   dB0, dB1, dB2, dB3, dB4, dB5, dB6, dB8, dB10, | | |
| |   dB12, dB14, dB16, dB18, dB20, dB22, dB24}, | | |
|     speedStateReselectionPars | SEQUENCE { | | |
|       mobilityStateParameters | MobilityStateParameters, | | |
|       q-HystSF | SEQUENCE { | | |
|         sf-Medium | ENUMERATED { | | |
| |   dB-6, dB-4, dB-2, dB0}, | | |
|         sf-High | ENUMERATED { | | |
| |   dB-6, dB-4, dB-2, dB0} | | |
|       } | | | |
|       q-HystCellTypeSF | SEQUENCE { | | |
|         ServingMacroNeighbourPico | ENUMERATED { dB-6, dB-4, dB-2, dB0}, | | |
|         ServingPicoNeighbourMacro | ENUMERATED { dB-6, dB-4, dB-2, dB0}, | | |
|         ServingPicoNeighbourPico | ENUMERATED { dB-6, dB-4, dB-2, dB0} | | |
|       } | | OPTIONAL, | -- Cond ON |
|     } | | OPTIONAL, | -- Need OP |
|   }, | | | |
|   cellReselectionServingFreqInfo | SEQUENCE { | | |
|     s-NonIntraSearch | ReselectionThreshold | OPTIONAL, | -- Need OP |
|     threshServingLow | ReselectionThreshold, | | |
|     cellReselectionPriority | CellReselectionPriority | | |
|   }, | | | |
|   intraFreqCellReselectionInfo | SEQUENCE { | | |
|     q-RxLevMin | Q-RxLevMin, | | |
|     p-Max | P-Max | OPTIONAL, | -- Need OP |
|     s-IntraSearch | ReselectionThreshold | OPTIONAL, | -- Need OP |
|     allowedMeasBandwidth | AllowedMeasBandwidth | OPTIONAL, | -- Need OP |
|     presenceAntennaPort1 | PresenceAntennaPort1, | | |
|     neighCellConfig | NeighCellConfig, | | |
|     t-ReselectionEUTRA | T-Reselection, | | |
|     t-ReselectionEUTRA-SF | SpeedStateScaleFactors | OPTIONAL, | -- Need OP |
|     t-ReselectionEUTRA-CellType-SF | CellTypeScaleFactors | OPTIONAL, | -- Cond ON |
|     t-ReselectionEUTRA-CellRE-SF | CellRangeExpansionScaleFactors | OPTIONAL, | -- Cond ON |
|   }, | | | |
|   ..., | | | |
| } | | | |
| -- ASN1STOP | | | |

Figure 8:
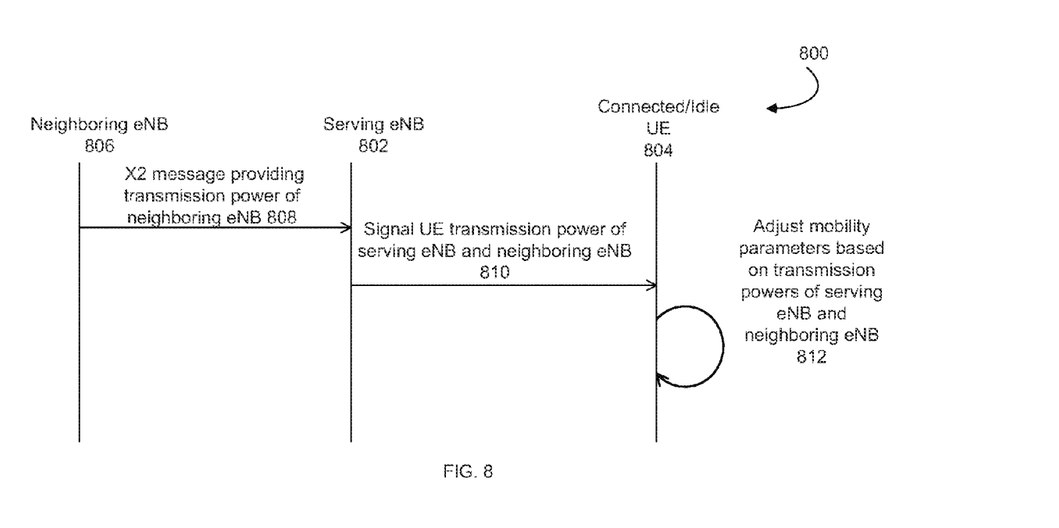
FIG. 8 is a schematic flow diagram illustrating transmission of serving eNB transmission power level and neighboring eNB transmission power level from a serving eNB to a UE.

FIG. 8 is a schematic flow diagram 800 illustrating transmission of serving eNB transmission power level and neighboring eNB transmission power level from a serving eNB to a UE. A neighboring eNB 806 may transmit the transmission power level to a serving eNB 802 via a backhaul message 808 on a backhaul interface, such as an X2 or S1 interface. The transmission power levels may be represented by the eNB transmit power class or the eNB downlink reference signal power and be exchanged on the backhaul interface. The serving eNB 802 may subsequently send a message 810 signaling the transmission power level of the serving eNB 802 and the neighboring eNB 806 to the UE 804. The UE 804 may be in a connected mode or in an idle mode. The transmission power levels may be categorized into multiple classes such that only a few bits are needed for signaling purpose. The UE 804 may then adjust mobility parameters based on the transmission power level of the serving eNB and neighboring eNB as shown in 812. For example, the UE 804 may identify that the neighboring eNB is a pico eNB and thereby scale down the time-to-trigger parameter associated with the neighboring eNB in order to improve the handover performance.

Figure 9:
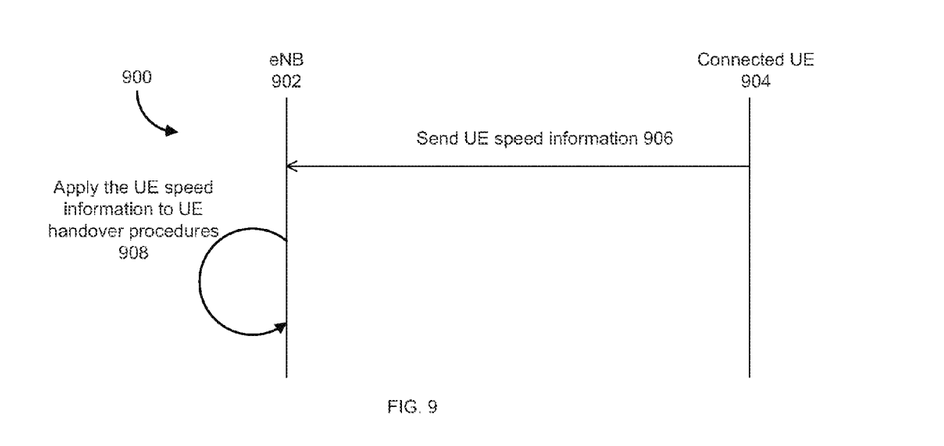
FIG. 9 is a schematic flow diagram illustrating transmission of UE speed information from a connected mode UE to an eNB.

An example of including the eNB's transmission power in the Relative Narrowband Transmission Power (RNTP) information element on X2 interface is illustrated in Table 6. In this example, an eNB transmit power class is added in the RNTP information element to exchange the eNB transmission power levels on the X2 interface.

to an eNB. As shown in FIG. 9, a connected mode UE 904 may send UE speed information in a message 906 to an eNB 902. The UE speed information transmitted in message 906 may be a quantized representation of its speed. The UE 904 may estimate its speed via a GPS, Doppler spread estimation or other techniques. The UE may include the speed information in some of the measurement reports, such as the measurement reports triggered by A3 event. In some implementations, the eNB may also determine the UE speed via the positioning schemes such as the observed time difference of arrival (OTDOA) and the uplink time difference of arrival (UTDOA). The eNB may also determine the UE speed based on the Doppler frequency estimation or time advance adjustment.

The eNB 902 may apply the UE speed information to UE handover procedures as shown in 908. For example, the eNB 902 may prioritize the handover request from a high speed UE among multiple UEs' handover request. The eNB 902 may expedite the handover procedures at the backhaul link for the high speed UE. The eNB 902 may send the handover command to the high speed UE at an earlier time prior to receiving a handover request acknowledgement from a target cell. The eNB 902 may also decide not to handover the high speed UE to a pico cell due to the pico cell's small coverage size and the UE's potential short stay on the pico cell. For example, if the UE is involved in the voice service, it is not good to handover the UE to a small pico cell for a short stay. This interruption of

TABLE 6

RNTP information element

| IE/Group Name | Presence | Range | IE type and reference | Semantics description | Criticality | Assigned Criticality |
|---|---|---|---|---|---|---|
| RNTP Per PRB | M | | BIT STRING (6..110, ...) | Each position in the bitmap represents a $n_{PRB}$ ... | — | — |
| RNTP Threshold | M | | ENUMERATED (−∞, −11, −10, −9, −8, −7, −6, −5, −4, −3, −2, −1, 0, 1, 2, 3, ...) | $RNTP_{threshold}$ is defined in TS 36.213 [11] | — | — |
| Number Of Cell-specific Antenna Ports | M | | ENUMERATED (1, 2, 4, ...) | P (number of antenna ports for cell-specific reference signals) | — | — |
| P_B | M | | INTEGER (0..3, ...) | $P_B$ is defined in TS 36.213 [11] | — | — |
| Transmit power class | O | | INTEGER (0..N, ...) | Cell transmit power class | | |
| PDCCH Interference Impact | M | | INTEGER (0..4, ...) | Measured by Predicted Number Of Occupied PDCCH OFDM Symbols ... | — | — |

The handover region size depends on multiple factors such as cell change type, range expansion capabilities of the serving and neighboring cells, the distance between the two cells, et al. Instead of performing scaling for each factor, another option is to combine all these factors and determine a single mobility parameter scaling factor for the serving cell and each neighboring cell. The serving cell can generate a neighboring cell list within which each scaling factor is associated to one neighboring cell. The neighboring cell specific scaling factor list can be broadcasted in SIB or signaled through RRC signaling to a UE by the serving cell. UE may further scale these parameters by physical speed dependent scaling factor as suggested by each network or according a device dependent procedure.

FIG. 9 is a schematic flow diagram 900 illustrating transmission of UE speed information from a connected mode UE the service may degrade the user experiences. In this case, the eNB may not signal the handover command to the UE. However, the eNB should make sure the packets can be transmitted reliably, for example, using the TTI bundling or more conservative modulation and coding scheme (MCS).

The UE may also estimate its mobility state by counting the number of cell changes during a certain period of time. Instead of counting each cell change equally, the UE may apply a scaling factor to cell changes involving a smaller size cell. For example, a macro-to-macro cell change may be counted as one cell change, a macro-to-pico and pico-to-macro cell change may be counted as 0.4 cell change, and a pico-to-pico cell change may be counted as 0.2 cell change. By applying appropriate factors to different types of cell changes in the counting procedure, better accuracy of the UE mobility state estimation may be achieved. These scaling factors may be signaled to the UE via RRC signaling. The eNB may pre-define several classes of the factors and only signal the index of the scaling factors to the UE. The eNB may also indicate to the UE whether a pico cell is deployed for a coverage hole or for traffic offloading. The UE may not count the pico cell related handovers or cell reselections if the pico cell is deployed for traffic offloading. Further, the eNB may also explicitly signal the UE whether the UE should count a particular handover or cell reselection in the mobility state estimation. Further, the eNB may also signal the UE that the UE may not count handovers or cell reselections relevant to a particular cell or particular cells in the mobility state estimation. In some implementations, the UE may identify the cell change types based on the eNBs' transmission power levels, use some pre-defined formula to calculate the associated scaling factors, and apply those scaling factors to the mobility state estimation. In some implementations, these scaling factors may be pre-configured hence no signaling is required.

When range expansion is enabled at pico cells usually Almost Blank Subframe (ABS) is configured at macro cells to reduce the interference to the UEs in the pico cell range expansion area. However depending on the ABS coordination among the macro cells, the Signal to Interference and Noise Ratio (SINR) levels in the pico cell range expansion area may not always be sufficient. The insufficient SINRs in the pico cell range expansion area may increase the failure rates of the pico-to-macro and macro-to-pico handovers.

To improve the mobility performance with cell range expansion, we should not force every UE in the range expansion area to connect to the pico cell. A pico cell UE in the range expansion area should be handed-over to or should reselect a macro cell if the SINR or Reference Signal Received Quality (RSRQ) from the pico cell is lower than a threshold. Similarly a macro cell UE should not be handed-over or should not reselect a pico cell range expansion area unless the SINR or RSRQ of the pico cell is higher than a threshold.

To enable the above RSRQ threshold, the network may configure an A2 event for a pico cell UE in the range expansion area with a corresponding threshold. This allows the network to be notified if the radio quality from the serving pico cell deteriorates and hence the network could hand-over a pico cell UE to a neighboring macro cell. Similarly the network may configure an A4 event for a macro cell UE with a corresponding threshold to avoid the network prematurely handing-over a macro cell UE to a neighboring pico cell range expansion area.

While several implementations have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method of operating user equipment (UE) in a wireless communications network, the method comprising:
    identifying, by the UE, a target cell type associated with a neighboring cell;
    in response to identifying the target cell type associated with the neighboring cell, determining, by the UE, a time-to-trigger parameter, wherein the time-to-trigger parameter is determined by applying a scaling factor associated with the target cell type to a nominal time-to-trigger value, the scaling factor associated with the target cell type is based, at least in part, on a transmission power level of the neighboring cell and a transmission power level of the UE's serving cell; and
    executing, by the UE, a mobility procedure with the neighboring cell using the time-to-trigger parameter.

2. The method of claim 1, wherein the mobility procedure comprises a cell handover procedure.

3. The method of claim 2, wherein the cell handover procedure includes a procedure for the UE to change its serving cell in a connected mode.

4. The method of claim 1, wherein the UE is associated with a current cell of a first cell type, and wherein the target cell type is a second cell type.

5. The method of claim 4, wherein the first cell type is one of a macro, pico, relay, or femto cell, and wherein the second cell type is one of a macro, pico, relay, or femto cell.

6. The method of claim 1, further comprising receiving, by the UE, the time-to-trigger parameter from a base station, using a radio resource control (RRC) message.

7. The method of claim 1, further comprising receiving, by the UE, the scaling factor associated with the target cell type from a base station, using a radio resource control (RRC) message.

8. The method of claim 1, wherein the transmission power of the neighboring cell is signaled to the serving cell via a backhaul interface.

9. The method of claim 1, wherein the mobility procedure comprises a cell reselection procedure.

10. The method of claim 1, wherein the cell reselection procedure includes a procedure for the UE to change its serving cell in an idle mode.

11. The method of claim 1, further comprising receiving, by the UE, at least one of an indication of the transmission power level of the neighboring cell or an indication of the transmission power level of the UE's serving cell.

12. User equipment (UE) for operating in a wireless communications network, comprising one or more processors configured to:
    identify a target cell type associated with a neighboring cell;
    in response to identifying the target cell type associated with the neighboring cell, determine a time-to-trigger parameter, wherein the time-to-trigger parameter is determined by applying a scaling factor associated with the target cell type to a nominal time-to-trigger value, the scaling factor associated with the target cell type is based, at least in part, on a transmission power level of the neighboring cell and a transmission power level of the UE's serving cell; and
    execute a mobility procedure with the neighboring cell using the time-to-trigger parameter.

13. The user equipment of claim 12, wherein the mobility procedure comprises a cell handover procedure.

14. The user equipment of claim 13, wherein the cell handover procedure includes a procedure for the UE to change its serving cell in a connected mode.

15. The user equipment of claim 12, wherein the UE is associated with a current cell of a first cell type, and wherein the target cell type is a second cell type, wherein the first cell type is one of a macro, pico, relay, or femto cell, and wherein the second cell type is one of a macro, pico, relay, or femto cell.

16. The user equipment of claim 12, the one or more processors further configured to receive the time-to-trigger parameter from a base station, using a radio resource control (RRC) message.

17. The user equipment of claim 12, the one or more processors further configured to receive the scaling factor associated with the target cell type from a base station, using a radio resource control (RRC) message.

18. The user equipment of claim 12, wherein the transmission power of the neighboring cell is signaled to the serving cell via a backhaul interface.

19. The user equipment of claim 12, wherein the mobility procedure is a cell reselection procedure.

20. The user equipment of claim 19, wherein the cell reselection procedure includes a procedure for the UE to change its serving cell in an idle mode.

21. The user equipment of claim 12, the one or more processors further configured to receive at least one of an indication of the transmission power level of the neighboring cell or an indication of the transmission power level of the UE's serving cell.

22. A non-transitory computer-readable medium coupled to the one or more processors having instructions stored thereon which, when executed by the one or more processors, cause the one or more processors to perform operations comprising:
identifying a target cell type associated with a neighboring cell;
in response to identifying the target cell type associated with the neighboring cell, determining a time-to-trigger parameter, wherein the time-to-trigger parameter is determined by applying a scaling factor associated with the target cell type to a nominal time-to-trigger value, the scaling factor associated with the target cell type is based, at least in part, on a transmission power level of the neighboring cell and a transmission power level of the UE's serving cell; and
executing a mobility procedure with the neighboring cell using the time-to-trigger parameter.

23. The computer-readable medium of claim 22, wherein the mobility procedure comprises a cell handover procedure.

24. The computer-readable medium of claim 23, wherein the cell handover procedure includes a procedure for the UE to change its serving cell in a connected mode.

25. The computer-readable medium of claim 22, wherein the computer readable medium is a user equipment (UE) associated with a current cell of a first cell type, and wherein the target cell type is a second cell type, wherein the first cell type is one of a macro, pico, relay, or femto cell, and wherein the second cell type is one of a macro, pico, relay, or femto cell.

26. The computer-readable medium of claim 22, the operations further comprising receiving the time-to-trigger parameter from a base station, using a radio resource control (RRC) message.

27. The computer-readable medium of claim 22, the operations further comprising receiving the scaling factor associated with the target cell type from a base station, using a radio resource control (RRC) message.

28. The computer-readable medium of claim 22, wherein the transmission power of the neighboring cell is signaled to the serving cell via a backhaul interface.

29. The computer-readable medium of claim 22, wherein the mobility procedure is a cell reselection procedure.

30. The computer-readable medium of claim 29, wherein the cell reselection procedure includes a procedure for the UE to change its serving cell in an idle mode.

31. The computer-readable medium of claim 22, the operations further comprising receiving at least one of an indication of the transmission power level of the neighboring cell or an indication of the transmission power level of the UE's serving cell.

* * * * *